United States Patent [19]

Hoying et al.

[11] Patent Number: 4,869,477
[45] Date of Patent: Sep. 26, 1989

[54] HYDRAULIC ENGINE MOUNT WITH AIR BELLOWS TUNING

[75] Inventors: John F. Hoying, Bellbrook; Stanley E. Smith, Dayton, both of Ohio

[73] Assignee: General Motors Corporation, Detroit, Mich.

[21] Appl. No.: 240,668

[22] Filed: Sep. 6, 1988

[51] Int. Cl.⁴ .............................................. F16F 9/50
[52] U.S. Cl. .................................... 267/140.1; 267/218
[58] Field of Search ...................... 248/562; 267/140.1, 267/218, 219; 280/706, 707

[56] References Cited

U.S. PATENT DOCUMENTS

| | | | |
|---|---|---|---|
| 4,415,148 | 11/1983 | Mair et al. | 267/122 |
| 4,558,173 | 12/1985 | Gajajiva et al. | 174/86 |
| 4,613,118 | 9/1986 | Morita | 267/140.1 |
| 4,664,363 | 5/1987 | Gold et al. | 267/140.1 |
| 4,712,777 | 12/1987 | Miller | 267/140.1 |
| 4,720,084 | 1/1988 | Hollerweger et al. | 267/217 |
| 4,756,513 | 7/1988 | Carlson et al. | 267/140.1 |

FOREIGN PATENT DOCUMENTS

| | | | |
|---|---|---|---|
| EPO 77195 | 4/1983 | European Pat. Off. | |
| 0117929 | 7/1984 | Japan | 267/140.1 |
| 59-222635 | 12/1984 | Japan | |
| 60-98237 | 6/1985 | Japan | |
| 0179543 | 9/1985 | Japan | 267/140.1 |
| 61-119832 | 6/1986 | Japan | |
| 61-233237 | 10/1986 | Japan | |
| 61-278639 | 12/1986 | Japan | |
| 2161241 | 1/1986 | United Kingdom | 267/140.1 |

*Primary Examiner*—Duane A. Reger
*Attorney, Agent, or Firm*—Ronald L. Phillips

[57] ABSTRACT

A hydraulic mount assembly is disclosed having a partition forming two hydraulic chambers and including a damping decoupler. A primary chamber is formed by an elastomeric member and a secondary chamber by a resilient diaphragm. During dynamic loading of the mount, fluid passes through an orifice between the two chambers of the mount causing expansion and contraction of the diaphragm. An expandable, pneumatic bellows is mounted within the primary chamber. A vent tube provides controlled fluid communication between the bellows and the atmosphere to provide a relatively soft mount for engine isolation. Air entry into the bellows is induced by the built-in spring memory of the bellows causing expansion. Air may be removed or partially removed from the bellows by an external vacuum source, causing a negative pressure and contraction. By controlling bellows expansion and contraction in this manner, the dynamic rate of the mount assembly may be selectively reduced at higher vibration frequencies; that is, those over 20 Hz. An assist spring may be provided in the bellows. Further, by evacuating the bellows, a relatively hard mount with standard operating parameters may be provided; i.e. a mount having relatively high damping and high rate for better control under extreme driving conditions. A control circuit with on-board transducers is provided to monitor vehicle operating and road conditions and modulate the pressure by controlling venting of the bellows and the vacuum in the bellows for maximum operating efficiency.

3 Claims, 1 Drawing Sheet

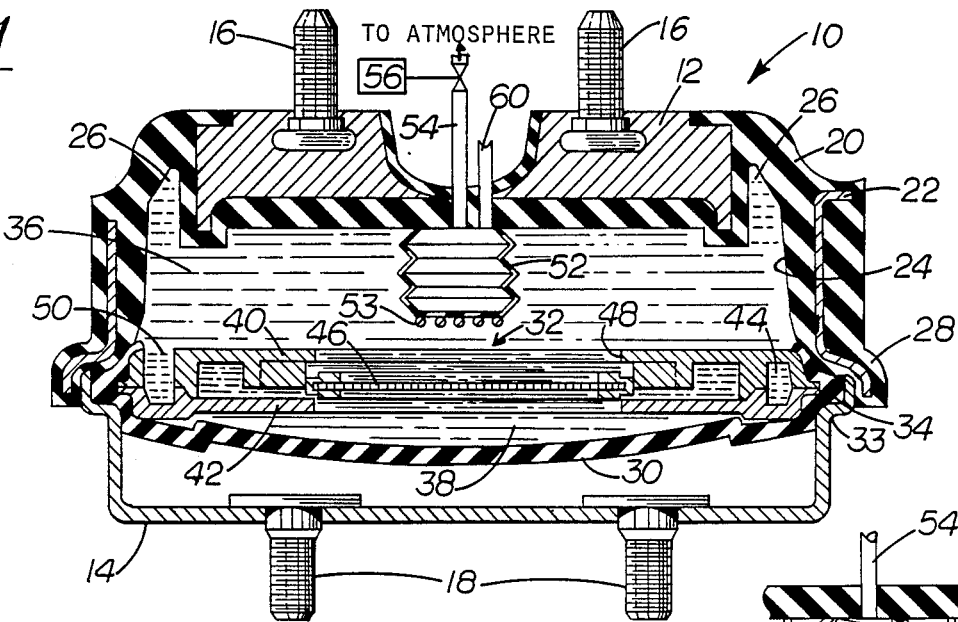
Fig. 1
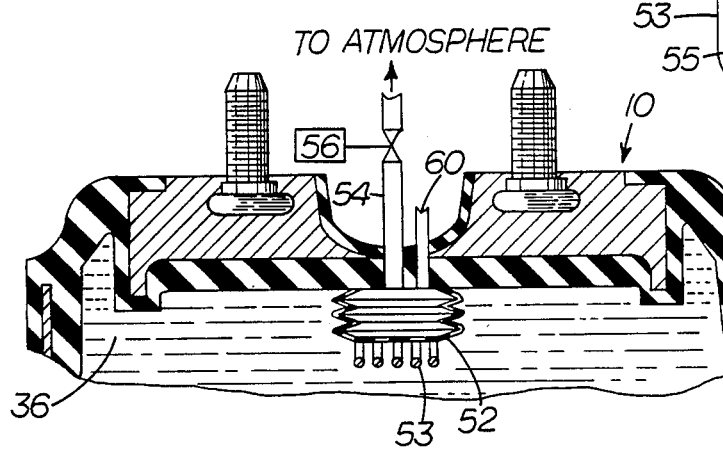
Fig. 2
Fig. 2A
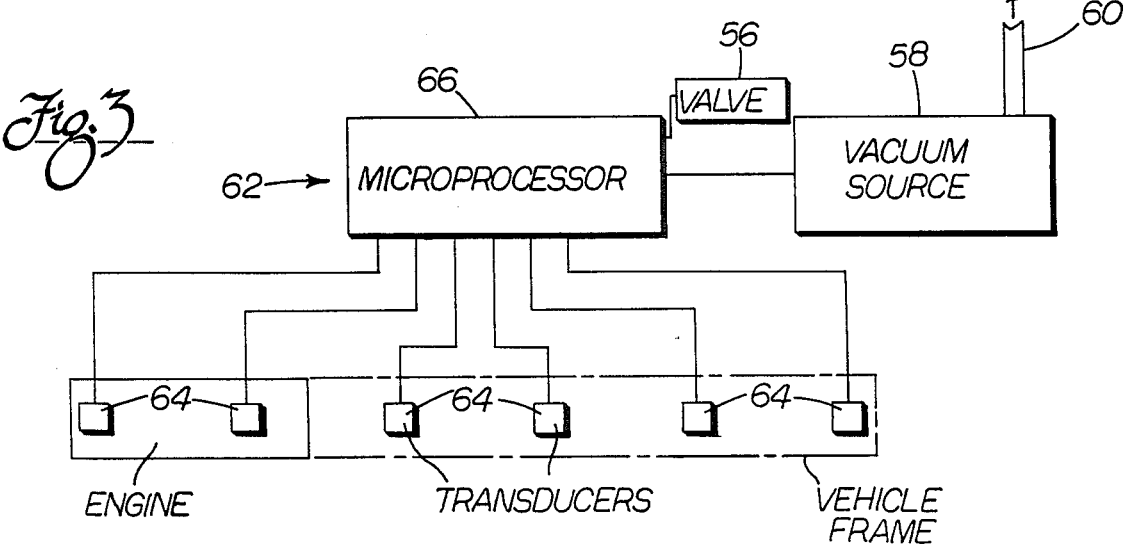
Fig. 3

4,869,477

HYDRAULIC ENGINE MOUNT WITH AIR BELLOWS TUNING

TECHNICAL FIELD

The present invention relates generally to hydraulic mounts for vibration damping and, more particularly, to a vehicle mounted hydraulic mount assembly containing an improved internal air bladder designed to provide variable dynamic rate and damping characteristics in response to vehicle operating conditions.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly a high level of damping force and smoothing action. The high inertia of the hydraulic fluid passing through the orifice track contributes to the relatively hard mount characteristic in this mode. As a third (intermediate) operational mode of the mount, medium amplitude inputs produce lower velocity fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Such a hydraulic mount is disclosed in U.S. Pat. No. 4,756,513 to Carlson et. al, issued July 12, 1988, and entitled Variable Hydraulic-Elastomeric Mount Assembly, assigned to the assignee of the present invention. This invention represents an improvement over previous mounts in that it provides a variable damping levels in response to sensed vehicle operating conditions. This tuning of the mount is accomplished by the use of an inflatable air bladder on the secondary chamber side to selectively control the diaphragm movement. The bladder acts directly against the diaphragm to modulate the action of the mount assembly. The inflation of the bladder is directed by an external control circuit and provides different infinite levels of damping. This control circuit includes a series of vehicle mounted tranducers communicating with a preprogrammed microprocessor. The transducers supply vehicle/component vibration information to the microprocessor which in turn directs the operation of the bladder. The orifice track sizes/lengths as well as the control circuit are designed to conform to each vehicle application.

Another recently developed hydraulic mount approaches the same desirable function of providing tuning of the mount, but in a different way. This mount, which has also proved successful, is disclosed in the copending Smith application, Air Bladder Controlled Hydraulic Engine Mount, Ser. No. 298,717, filed Jan. 19, 1989 assigned to the assignee of the present invention. This mount includes an air bladder within the primary chamber rather than on the secondary side. The same desirable result is to vary the levels of damping and rate in response to vehicle operating conditions. The bladder communicates with the atmosphere through a tube having a control valve. The pumping action of the fluid within the primary chamber of the mount is then utilized to inflate/deflate the bladder.

Improved engine isolation results from the generally softer damping action as the bladder compresses and inflates with ambient air according to the adjustment of the valve. The bladder expansion/contraction reduces the damping effect since the air compressible) takes precedence over hydraulic fluid movement along the orifice track and expansion/contraction of the diaphragm. Alternatively, the valve is closed completely and a variable pressure source is provided to actively inflate (or deflate) the bladder via a separate air pressure line.

While the Smith mount represents another significant improvement advance in the art over the original Carlson mount, further improvements are desirable. A particular need is identified in the area of further simplifying the mount system. It is desirable that increased power be built into the structure of the bladder itself. At the same time, there must be no significant loss of the ability to provide the desirable variable damping levels throughout the range of vehicle operating conditions.

SUMMARY OF THE INVENTION

Accordingly, it is a primary object of the present invention to provide a hydraulic mount assembly overcoming the limitations and disadvantages associated with the relative complexity of the prior art mount systems.

Another object of the present invention is to provide a hydraulic mount assembly that is actively tunable utilizing the built-in spring memory of a bellows to provide variable damping characteristics so as to more efficiently and effectively isolate vibrations and suppress noise over the entire range of vehicle operating and road conditions.

Yet another object of the present invention is to provide an improved hydraulic mount that includes an internal pneumatic bellows in the primary chamber having active spring memory which can be deflated or patially deflated in response to sensed vehicle vibrations thereby providing increased control of damping and dynamic rate and enhanced vehicle operating characteristics.

Still another object of the present invention is to provide an improved hydraulic mount including an internal pneumatic bellows in the primary chamber which may be controlled by venting to the atmosphere and without positive pneumatic pressure at virtually all vehicle operating frequencies, so as to reduce both damping and dynamic rate and thereby provide a relatively soft mount for better engine isolation.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an actively tunable hydraulic mount assembly is provided for damping and isolating engine and transmission vibrations. The preferred embodiment of the mount assembly selected to illustrate the invention includes a pair of mounting members connected to each other through a hollow elastomeric body. This hollow body is closed by a resilient diaphragm so as to form a cavity for a damping liquid, which may be a commercial engine antifreeze coolant. A partition or plate is provided to divide the fluid filled cavity into two distinct chambers. The primary chamber is formed between the partition and the interior wall of the hollow body. The secondary chamber is formed between the partition and the interior wall of the diaphragm. The partition further includes a decoupler and a fluid passage or orifice track connecting the two chambers.

According to an important aspect of this invention, a pneumatic bellows having built-in resilient memory is provided as the bladder in the primary chamber of the mount. When simply vented to atmospheric pressure, this bellows expands and serves to reduce not only the damping level, but also the dynamic rate of the mount. To put it another way, the bellows self inflates against the internal hydraulic pressure. The bellows, in turn collapses or expands as vibration forces are transmitted to the hydraulic fluid of the mount. Advantageously, inflation of the bellows is simply controlled by opening a vent valve, allowing fluid communication with the atmosphere. Evacuation of the bellows to reduce or eliminate the effect is accomplished through an external vacuum source, which may be a pump or simply engine manifold vacuum.

Advantageously, the active memory of the bellows makes this particular structure ideally suited as an enhancement for the bladder structure of the prior art. The natural springiness of the accordian folds of the bladder is sufficient to give close to the ideal resistance to the hydraulic fluid movement in the mount. By simply venting to the atmosphere the tuning of the damping and the dynamic rate characteristics of the mount to sensed actual vehicle vibration and operating conditions provides more efficient and effective vibration and noise suppression. For example, the hydraulic mount may be actively tuned back and forth between a relatively "soft" condition of low damping and low rate for best engine isolation and a relatively "hard" condition of high damping and high rate for best engine control, as required for maximum performance-type driving. A further enhancement calls for a simple vacuum-only source to collapse the bladder against the built-in spring force to eliminate its function and return the mount to standard operation. By partial evacuation, the built-in memory of the bladder can be partially cancelled providing an additional mode of operation for infinite intermediate range control.

In operation of the mount, vibration forces within the design amplitudes and frequencies of the mount produce alternate contraction/expansion of the hollow body and primary chamber. When the vibration is initiated, the liquid first causes reciprocation of the decoupler. Certain small vibratory amplitudes usually produced at high frequencies; for example, such as during smooth engine idling, are thus accommodated by the alternate increases and decreases in the chamber volumes resulting from decoupler reciprocation. As a result, significant fluid flow through the restricted passage or track between the chambers, and therefore damping is avoided.

In contrast, during large vibratory amplitudes, the decoupler ceases reciprocating. Assuming that the bellows is fully evacuated so as to be flattened against the upper wall of the primary chamber, all of the damping fluid flow occurs between the primary and secondary chambers. This flow is through the orifice track in the partition. The resistance to flow of the hydraulic fluid and the fluid inertia provide the damping action. The relatively hard mount characteristic is provided by this mode.

To explain further, upon contraction of the primary chamber, liquid entering the secondary chamber causes stretching of the diaphragm, increasing the volume of the secondary chamber. Then upon reversal of the force, resulting in expansion of the primary chamber, the stretched diaphragm contracts forcing liquid back to the primary chamber, completing the damping cycle. In this manner, the mount advantageously provides vibration isolation and noise suppression with the utmost efficiency for the purpose intended.

As the chamber volumes cycle, internal pressures cycle accordingly. Since the bellows is filled with a compressible fluid (air in the preferred embodiment), some of the damping fluid compresses the bellows and the rest travels through the orifice track back and forth to the secondary chamber. This happens because the compressed air in the bellows offers less resistance, and thus takes precedent over the normal hydraulic fluid movement. This results in less damping fluid flows between chambers providing lower damping and a softer mount.

As stated above, a most desirable feature is that the bellows is self inflating. Advantageously, this action occurs at a substantially linear rate. This is due to the resilient memory in the folds of the bellows. This built-in or active force of the bellows is sufficient to overcome the elastic force of the diaphragm to allow the self inflation. Because of the folds in the bellows structure, there is no coining or over-center action that can occur with a simple convex-shaped bladder. The resilient memory and straight-line movement action allows highly effective inflation/deflation without the requirement of an external positive pressure source. This simplifies the system, makes installation easier and thus reduces overall cost.

The use of built-in resiliency also improves the response time of the bellows. The spring force is located directly at the point of need rather than separated by an air pressure line. Thus, there is essentially no lag time in applying the active force when the action of the mount calls for expansion/contraction.

The preferred embodiment of the invention utilizes the bellows fabricated of polyester elastomer marketed under the trademark Hytrel. This material is preferred for its springiness and for the long life capability.

The bellows is in fluid communication with the atmosphere through a valved tube. Due to the self-expanding feature of the bellows, inflation is controlled simply by opening the valve, allowing atmospheric air into the bellows. In this manner, full or partial inflation can be precisely controlled. The rate of inflation/deflation can also be regulated by partial opening of the valve.

Evacuation of the bellows is accomplished by an external vacuum source. This is provided to disable the bellows for standard mount operation, as explained above, or to further modulate the bellows action by applying a partial vacuum. The vacuum source, as well as the vent valve, is controlled by an external pre-programmed control circuit including vehicle and engine mounted transducers to sense vehicle vibration. The bellows internal pressure is controlled to partially offset or cancel a portion of the built-in memory in response to vehicle operating conditions. This provides optimum variation in the damping and rate response.

The overall damping characteristics of the mount itself are lessened at higher frequencies due mainly to lower velocity, smaller frictional forces in the fluid. This results in desirable damping over the full range of vehicle operating conditions. As mentioned, when the bellows is completely evacuated and held against the upper wall, the high vibration, high damping rate is restored. Accordingly, the mount may be actively and positively tuned to provide optimum damping and dynamic rate characteristics from a hard mount to a soft mount; i.e. optimum control over all vehicle operating conditions.

Still other objects of the present invention will become apparent to those skilled in this art from the following description when they are shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing:

FIG. 1 is a cross-sectional view of the hydraulic mount of the present invention showing the flexible, pneumatic bellows mounted within the primary chamber of the mount and fully inflated;

FIG. 2 is a partial cross-sectional view of the hydraulic mount of the present invention showing the bellows partially evacuated;

FIG. 2a is a cross-sectional view of an alternative embodiment including an internal spring to further assist bellows inflation;

FIG. 3 is a schematic representation of the control circuit of the present invention;

DETAILED DESCRIPTION OF THE INVENTION

Reference is now made to the drawing and particularly to FIG. 1 showing the present preferred embodiment in the form of an improved hydraulic-elastomeric mount assembly 10. This mount is particularly adapted for mounting a component, such as an internal combustion engine in a vehicle. The dynamic characteristics of the mount assembly 10 of the present invention, however, may be actively adjusted or tuned to meet the specific application. As a result, the desired amplitude control, as well as the coefficient of damping and resulting dynamic rate best suited to isolate a particular vibration condition, can be obtained. The mount assembly 10 can of course be used in applications other than engine mounts, where controlled damping of vibration is desired especially with a reduced damping action at high frequencies.

The mount assembly shown in FIG. 1 includes a cast metal mounting member 12 and stamped sheet metal mounting member 14. The mounting members 12 and 14 have a pair of mounting studs 16, 18, respectively. These studs 16, 18 project outwardly from the mounting members 12, 14 for attachment respectively to an engine (not shown) and an engine supporting cradle or frame of a vehicle (not shown).

A hollow elastomeric body 20 interconnects the mounting members 12, 14. The body 20 is constructed of natural or synthetic rubber. More specifically, the body 20 may be molded to and about the mounting member 12 and includes an embedded stamped sheet metal retainer 22.

The body 20 defines a hollow cavity 24 for receiving a damping liquid, such as commercial engine antifreeze/coolant. Oppositely located voids 26 are formed in the body between the mounting member 12 and the retainer 22. These voids 26 provide directional dynamic rate control within the elastomeric body 20 itself and form a part of the damping liquid cavity 24. As is known in the art, such voids 26 are especially useful in isolating certain internal combustion engine vibrations.

Together, the mounting member 12, elastomeric body 20 and metal retainer 22 form a first subassembly or cover of the mount assembly. The retainer 22 includes an outwardly projecting collar 28 at its lower periphery. The collar 28 is formed to receive a second subassembly or base. The base comprises the mounting member 14, elastomeric diaphragm 30 and a partition 32 with flow orifices.

The elastomeric diaphragm 30 includes an annular rim portion 34 having a peripheral groove formed between upper and lower shoulders respectively. The shoulders are flexible so as to receive the outer edge of the partition 32. Thus, the partition 32 is sealingly engaged by the shoulders on opposite sides of the groove.

The mounting member 14 is formed with a collar 33 to receive the rim portion 34 of the diaphragm 30. Collar 33 of member 14 fits within collar 28 of the retainer 22. As is known in the art, tabs (not shown) may be provided on the collar 28 and bent over to retain and seal the whole mount assembly.

The elastomeric diaphragm 30 closes the elastomeric body 20 so as to form therewith the closed damping cavity 24. This cavity 24 is divided by the partition 32 into a primary chamber 36 enclosed by the elastomeric body 20 and a secondary chamber 38 enclosed by the diaphragm 30.

The partition 32 is formed of non-magnetic material, and includes a pair of plates 40, 42 with matching peripheries. Plates 40, 42 span the cavity 24 and cooperate to define a damping orifice track 44 interconnecting the chambers 36, 38.

A decoupler 46 in the form of a rectangular plate formed of metal or plastic is positioned in a central opening 48 in the plates 40, 42. The decoupler 46 is mounted for limited up and down reciprocal movement in the partition 32. The respective upper and lower faces of the decoupler 46 are directly engaged by the damping liquid within the primary and secondary chambers 36, 38. As a result, the decoupler 46 provides reciprocating movement in response to minimum amplitude alternating pressure build-ups in the chambers 36, 38 acting on opposite faces of the decoupler. This reciprocating movement within the plates 40, 42 toward and away from the chambers 36, 38 produces a limited volume change in primary and secondary chambers that effects hydraulic decoupling.

The flow passage or orifice track 44 is provided in the partition 32 to provide a flow of damping fluid between the primary and secondary chambers 36, 38 respectively. As shown, orifice track 44 communicates between the two chambers via opening 50 in plate 40 and an orifice in plate 42 (not shown). The length of track 44 can be fine tuned to the particular resonance frequencies of the component being damped.

During smooth operation, such as during smooth engine idling, low amplitude high frequency vibrations are produced. The decoupler 46 reciprocates in response to these low amplitude vibrations and the mount provides very little damping effect.

As vibration amplitudes and frequencies increase, the decoupler reaches the limit of its travel. At this point, damping fluid flow is initiated and flow occurs along the orifice track 44. This hydraulic fluid flow provides the damping action of the standard (Gold type) mount that is generally increasing above the 20 hertz (Hz) level and then tapers off at the higher frequencies. At higher frequencies and amplitudes, regardless of the cause (simply rough idle or conversely maximum engine loading) the standard engine mount provides high damping characteristic. However, at these frequencies and amplitudes, it is desirable to have the softer acting, more engine isolating mount mode for certain conditions, such as the rough engine idle condition. By the nature of the standard mount, the same high level damping that is desired under extreme operating conditions for maximum engine control has to be tolerated under all circumstances.

In accordance with the present invention as shown in FIGS. 1 and 2, a self-inflating pneumatic bellows 52 is provided inside the primary chamber 36 of the mount assembly 10. In the preferred embodiment, the bellows 52 has accordian folds and is basically an expansible cylinder. The bellows 52 is fabricated from a polyester elastomer, such as Hytrel available from E. I. DuPont DeNemours of Wilmington, DE.

Advantageously, the folds of the bellows 52 have a substantial level of "memory" which urges full extension. In this manner, the bellows 52 inflates itself, that is, has sufficient elastic force to overcome the counteracting elastic force of the diaphragm 30. This negates the requirement of an external pressure source and associated hardware of the earlier approaches. As explained above, it has been found that the bellows 52 exhibits improved response speed and substantially linear characteristics, thus substantially improving operations as a mount action modulator.

Cage 53 is provided to negate any possibility of bellows over-inflation. Advantageously, the cage 53 assures that the bellows 52 remains within in its elastic range by preventing over extension. A spring 55 may be added inside the bellows 52 (see FIG. 2A) if additional elastic force is required.

During operation, when the bellows 52 is inflated (see FIG. 1), some of the increased internal hydraulic pressure in the primary chamber 36 is expended by compressing the air in the bellows 52. Since the air is relatively easy to compress as compared to the damping movement of the hydraulic fluid, less hydraulic fluid flow occurs through the orifice track 44. On the return stroke, the bellows 52 enlarges to its original size, thus reducing the amount of hydraulic fluid that must be returned from the secondary chamber 38, and again reducing the damping effect. As a result, the damping level in both directions is reduced.

To achieve the controlled pressurization of the pneumatic bellows 52, an air transfer tube 54 is provided and includes a valve 56 which allows atmospheric air to enter/exit the bellows 52. Positive evacuation of the bellows is accomplished by a vacuum source 58. The vacuum is applied to the bellows 52 through tube 60, after the valve 56 is closed.

The vacuum source 58 and the valve 56 are controlled by a control circuit 62 which includes a plurality of vehicle mounted tranducers 64 and a microprocessor 66. Control circuit 62 forms means for fine tuning the mount assembly 10 in response to sensed vehicle operating conditions and vibrations.

During operation, the control circuit 62 responds to sensed vehicle vibrations by opening valve 56, allowing the bellows 52 to inflate. The bellows inflates due to its built-in spring memory. As a result of vibrations imposed on the mount assembly, the air in the bellows 52 is alternately expanded in this manner and then compressed by the hydraulic fluid in the primary chamber 36. Ultimately, less hydraulic fluid flows along orifice track 44 thereby providing a softer mount. It should be emphasized that the control circuit 62 can be programmed to provide optimum bellows pressure for variable modulation throughout the entire range of vehicle operating conditions.

Generally, the mount of the present invention produces desirable damping characteristics over the entire range of operating conditions similar to that obtained in prior Smith mount referred to above, but with the advantage of having the simplified structure. The damping is desirably reduced at higher frequencies (over 20 Hz), providing a softer, engine isolating mount.

The rate generally decreases with increasing frequency especially in the range greater than 140 Hz. Over the entire range the response time is significantly improved. From experimentation, it has also been determined that increasing the size of the bellows generally results in even greater rate reduction. Thus, by selecting an appropriate size, the mount can be fine tuned for a wide variety of vehicle applications.

When increased/maximum damping is desired to be retained, especially in the high frequency range, the vacuum source 58 is simply activated to partially or completely evacuate the bladder 52. Under the full evacuated condition, there is no compressible fluid in the primary chamber 36, and thus the mount assembly 10 is returned to the full damping mode.

In summary, numerous benefits result from employing the concepts of the present invention. The hydraulic mount assembly 10 employs an improved variable damping system including a pneumatic bellows 52 in the primary chamber 36 serving to actively modulate the damping characteristics of the mount by its own built-in spring force. The bellows 52 inflation/deflation is controlled via use of control circuit 62 by operation of the vent valve 56 and the connection of the vacuum source 58. The bellows 52 exhibits highly linear response and exhibits no tendency to suddenly collapse or coin. Advantageously, a most desirable balance of engine control versus engine isolation can thus be provided at all times, throughout the entire range of vehicle oeprating conditions. The full range control is obtained without employing outside positive pressure, as previously deemed to be important.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly for a vehicle, comprising:
  a pair of mounting members;
  a hollow body connected to said mounting members;
  an elastic diaphragm closing said hollow body and forming therewith a closed cavity that is filled with hydraulic fluid;
  means for partitioning said cavity into a primary chamber and a secondary chamber enclosed by said diaphragm;
  an office in said partitioning means connecting said chambers so as to effect damping; and
  a self expanding pneumatic bellows mounted within said primary chamber for controlling the damping and the dynamic rate of said mount assembly on the vehicle at relatively high frequencies of vibration for tuning said mount assembly, said bellows having a self expanding force sufficient to overcome a counteracting elastic force of said diaphragm.

2. A hydraulic mount assembly for a vehicle, comprising:
  a pair of mounting members;
  a hollow elastic body connected to said mounting members;
  an elastic diaphragm closing said hollow body and forming therewith a closed cavity that is filled with hydraulic fluid;
  means for partitioning said cavity into a primary chamber and a secondary chamber enclosed by said diaphragm;
  an orifice in said partitioning means connecting said chambers so as to effect damping;
  a self expanding elastic bellows mounted within said primary chamber and filled with a compressible fluid, said bellows having a self expanding elastic force sufficient to overcome a counteracting elastic force of said diaphragm;
  means for positively limiting the expansion of said self expanding bellows;
  means for sensing vehicle operating conditions and resulting vibrations; and
  means for controlling expansion of said bellows against the elastic force of said diaphragm in response to said means for sensing vehicle operating conditions, whereby damping and dynamic rate characteristics of said mount assembly may be tuned as desired especially for relatively high frequency vibrations.

3. A hydraulic mount assembly for a vehicle, comprising:
  a pair of mounting members;
  a hollow elastic body connected to said mounting member;
  an elastic diaphragm closing said hollow body and forming therewith a closed cavity that is filled with hydraulic fluid;
  means for partitioning said cavity into a primary chamber and a secondary chamber enclosed by said diaphragm;
  an orifice in said partitioning means connecting said chambers so as to effect damping;
  an expandable, elastic bellows mounted within said primary chamber and filled with a compressible fluid;
  the elastic force of said bellows being sufficient to provide self-inflation against the elastic force of said diaphragm on said hydraulic fluid in said cavity when said secondary chamber is expanded;
  means for providing fluid communication between said bellows and the atmosphere;
  valve means for selectively opening and closing said means for providing fluid communication with the atmosphere;
  vacuum supply means connected to said expandable bellows to selectively reduce the fluid pressure within said bellows;
  means for sensing vehicle operating conditions and resulting vibrations; and
  means for selectively controlling said valve means and said vacuum supply means in response to said means for sensing vehicle operating conditions whereby the damping and dynamic rate characteristics of said mount assembly may be tuned as desired especially for relatively high frequency vibrations.

* * * * *